July 9, 1957 — E. L. LAUNDER — 2,798,403
SECTIONAL RETAINER PIN HAVING INWARDLY AND
OUTWARDLY FACING SHOULDERS THEREON
Filed May 13, 1955
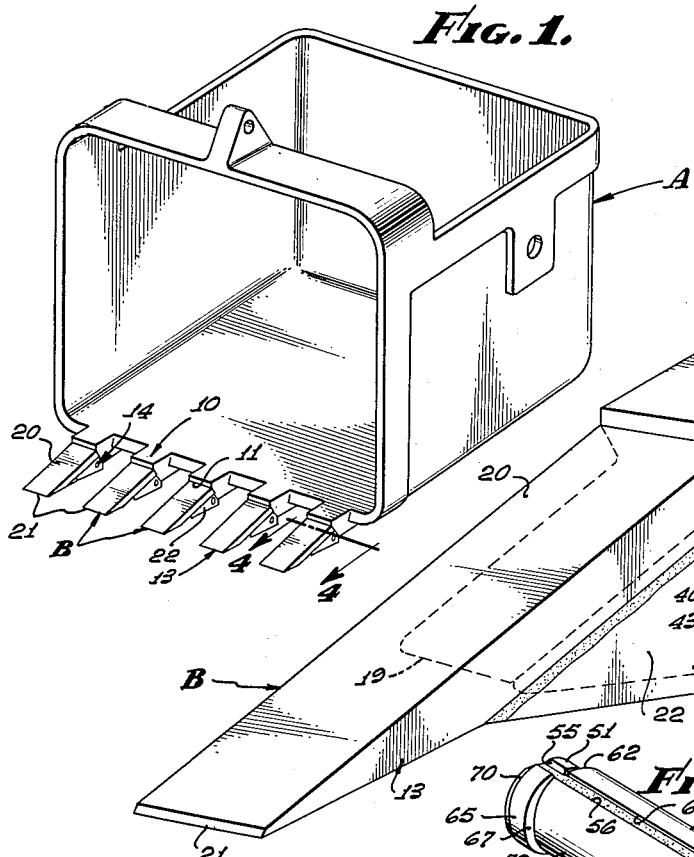
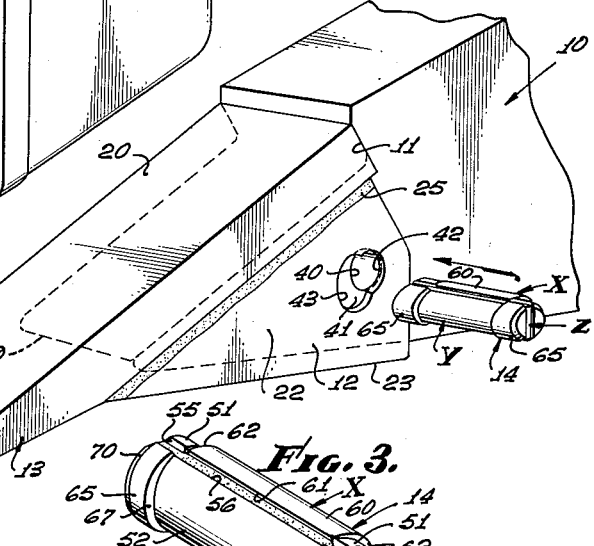
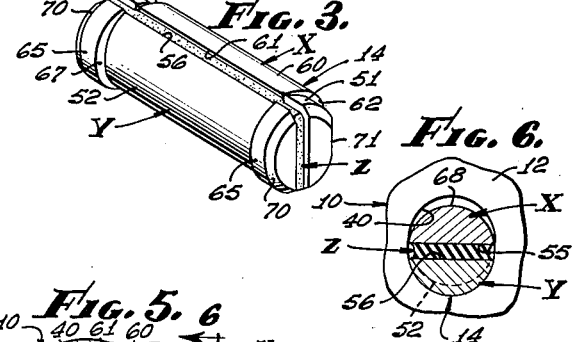
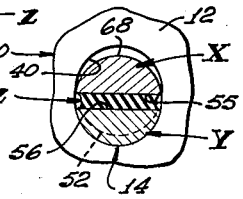
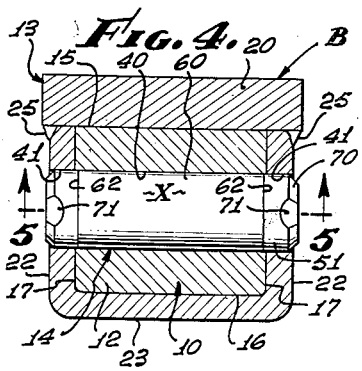
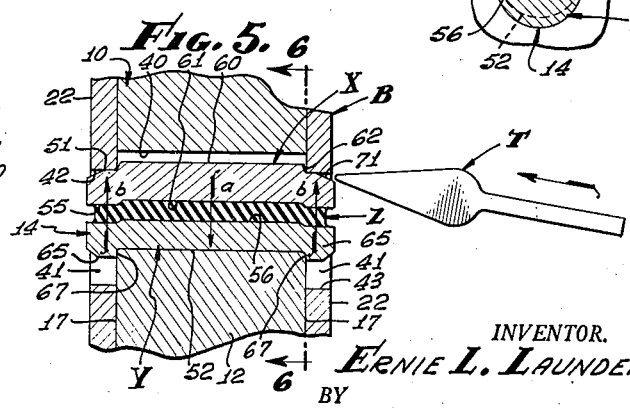
INVENTOR.
ERNIE L. LAUNDER
BY
Wm. H. Maxwell Jr.
AGENT.

Patented July 9, 1957

2,798,403
SECTIONAL RETAINER PIN HAVING INWARDLY AND OUTWARDLY FACING SHOULDERS THEREON

Ernie L. Launder, Montebello, Calif., assignor to H. & L. Tooth Company, Montebello, Calif., a corporation of California Application May 13, 1955, Serial No. 508,127

7 Claims. (Cl. 85—8.3)

This invention relates to a flexible pin fastener construction whereby parts are connected or joined by a unitary fastening device, it being a general object of this invention to provide a simple, practical, dependable fastener or joined construction wherein a pin is easily applied and removed from relatively movable parts.

Reference is made to my Patent No. 2,568,075, entitled "Cap Fastener for Excavating Bucket Digging Teeth," issued September 18, 1951.

An object of this invention is to provide a flexible pin type fastener in which two like metal sections are joined in a unitary device by a body of rubber or the like, so that the metal sections have limited movement relative to each other. In the fastener of the present invention the metal sections are generally alike and have like opposite end portions and the body of rubber occurs between the metal sections and connects them so that they have limited movement relative to each other.

Another object of this invention is to provide a fastener of the general character referred to in which the metal sections have enlargements that form shoulders, there being inwardly facing shoulders one one section and outwardly facing shoulders on the other section. The shoulders are engageable in and with the parts that are fastened or joined by the pin.

It is another object of this invention to provide a flexible pin type fastener of the character referred to involving a pair of metal sections and a resilient spreader between the sections, the sections being yieldingly urged by the spreader to substantially fill the fastener receiving holes in the parts connected to secure the parts tightly and one against the other.

It is still another object of this invention to provide a pin type fastener that can be readily driven into and out of operating position where it connects parts and which dependably remains in operating position and is releasable from the parts only upon deliberate manipulation with a suitable tool. Even severe shocks and strains will not loosen the fastener which because of its flexibility adapts itself to varying conditions.

The flexible pin fastener that I have provided is applicable to various structures or machines where relatively movable parts are joined as by a bolt or like pin. I will describe the pin of this invention as applied to a digger tooth, it being understood that the pin may be used in many other situations or structures. The flexible pin fastener of the present invention can be used to advantage in connection with motor vehicles, railway equipment, for example, brake rigging of railroad cars and in like situations. More specifically, the invention is applicable to machines and machinery or parts thereof, such as are required to be connected together, the particular application of the invention hereinafter set forth being given in way of example only.

A construction employing the present invention may include a part in the form of a shank projecting from a bucket or implement and having a forwardly tapered or diverging tip at its leading end. A second part may be a cap engaged over the tip. A typical cap may have a heavy flat blade that bears on the top of the top and which has a sharpened forward end. The cap has sides that depend from the edges of the blade and fit against the sides of the tip and are preferably coextensive therewith. A bore is provided transversely through the tip from one side to the other and corresponding aligned openings are provided in the sides of the cap and are positioned to be somewhat forward of the hole or opening provided in the tip. A retainer in the form of a flexible pin is engaged through the cap and tip, and is a laminated or sectional construction and involves two like metal sections each substantially semi-circular in cross section, and a spreader section. The spreader section is preferably a body of rubber or the like, that is arranged between and which is preferably bonded to the metal sections to normally yieldingly urge the sections apart to maintain the pin in tight connection with the tip and cap.

The various objects and features of my invention will be fully understood from the following detailed description of a typical preferred form and application of my invention, throughout which description reference is made to the accompanying drawings, in which:

Fig. 1 is a perspective view of an implement in the form of a bucket having a plurality of digger teeth projecting therefrom and incorporating the pin of the present invention. Fig. 2 is an enlarged perspective view of one of the digger teeth shown in Fig. 1, and showing the flexible pin retainer and the openings in the tooth parts to which the pin is applied. Fig. 3 is an enlarged perspective view of the pin that I have provided. Fig. 4 is an enlarged sectional view taken as indicated by line 4—4 on Fig. 1. Fig. 5 is a sectional view taken as indicated by line 5—5 on Fig. 4, and showing the manner in which a tool or implement may be utilized to remove the pin of the present invention, and Fig. 6 is a sectional view taken as indicated by line 6—6 on Fig. 5.

As hereinabove pointed out the structure provided by this invention is particularly applicable to digger teeth or the like, and it is particularly practical and can be used to advantage in connection with the cap of a digger tooth, in which case it is employed for securing the cap on the tip of a shank or the like. It is to be understood that the pin may be used in various situations and may be modified or varied as circumstances require.

In the drawings an implement in the form of a bucket A is shown provided with a plurality of forwardly projecting digger teeth B. Each tooth is shown as involving a forwardly projecting shank 10 with a flat front face 11 and a tip 12 projecting forward from the face of the shank. A cap 13 is applied to or over the tip of the shank and a retainer 14 in the form of a pin releasably secures the cap in operating position on the tip.

In the preferred form of construction the shank 10 and tip 12 form a rigid unitary element. The tip is forwardly convergent or tapered and in the form illustrated it involves a flat forwardly extending top 15, a flat forwardly extending bottom 16 and flat parallel sides 17. The top 15 and bottom 16 converge and come together or terminate at a forward point 19.

The cap 13 may vary widely in form and construction, it being preferably a unit which is applied to and which encases the tip 12. In the case illustrated the cap 13 involves a top or blade 20 with a forwardly projecting portion having a sharpened edge 21. The blade 20 is arranged over and bears on the top 15 of the tip. Sides or cheeks 22 depend from the edges of the blade 20 and fit over or against the sides 17 of the tip. It is preferred that the sides or cheeks 22 of the cap be made the same size and shape as the sides 17 of the tip to be coextensive therewith, as shown throughout the drawings. A bottom 23 joins or extends between the lower edge portions of the cheeks 22 and bears on or fits against the bottom 16 of the tip. In the preferred construction the cap above described is a fabricated element or unit, the bottom and cheeks being formed of a sheath, shaped and bent in the desired manner, and the upper edges of the cheeks 22 are permanently or rigidly joined to the blade 20 as by welding, or the like. In the drawings, welding material is shown at 25 permanently bonding the cheeks 22 to the blade 20. In the particular case illustrated the rear or inner end of blade 20 abuts the front face 11 of the shank 10 immediately above the tip 12.

The retainer 14 provided by the present invention is in the nature of a pin and to accommodate the retainer a transverse opening 40 is provided through the tip 12 from one side thereof to the other, and openings 41 are provided in the cheeks 22 of the cap and communicate with the opening 40 in the tip when the cap is in place on the tip. It is preferred that the bore or opening 40 through the tip be larger than the diameter of the pin or elongated somewhat in cross sectional configuration in the direction in which the tip extends or projects from the face 11, and as shown throughout the drawings, the openings 41 in the cheeks 22 may be likewise enlarged or elongated in cross section. In practice, the opening 41 has a forwardly faced bearing face 42 arcuately formed to have seating engagement with the convex exterior of the pin 14, and has a clearance portion 43 of increased diameter that extends forwardly from the bearing face 42.

The retainer pin 14 provided by the invention is an elongate unit engageable with or applicable to the assembled cap and tip shown in Fig. 2, and when in place or in operating position it extends through both the cap and the tip as shown in Figs. 4 and 5. The pin 14 is a fabricated or sectional structure preferably involving two similar metal sections X and Y and a center or spreader section Z that occurs between the metal sections. The metal sections X and Y are basically alike and extend longitudinally of the pin and have outer convex faces 51 and 52 and inner flat faces 55 and 56. In the preferred construction the faces 51 and 52, and 55 and 56 are so shaped and proportioned that the sections of the pin are substantially semi-circular in cross sectional configuration as shown in Fig. 6.

The pin section X is made of a single integral body of material and is characterized by having a central laterally projecting boss 60 that extends from the outer convex face 51. In the particular case illustrated the flat inner face 55 is somewhat offset outwardly at the center portion 61 thereof thereby enlarging the exterior convex side or face of the pin section X to form the boss 60. In accordance with the invention the boss 60 is in the nature of an enlargement on the central portion of the pin X forming outwardly facing shoulders 62 which engage the inner faces of the sides or cheeks 22 of the cap 13. The boss 60 projects from the body of the pin section X to establish the opposed shoulders 62 and these shoulders are spaced apart to receive or accommodate the tooth cap 13 in the manner clearly illustrated in Fig. 5 of the drawings.

The pin section Y is made of a single integral body of material and is characterized by having laterally projecting heads 65 at the ends thereof that extend from the outer convex face 52. In the particular case illustrated, the flat inner face 56 is somewhat offset outwardly at the terminal ends of the section Y thereby enlarging the exterior convex side or face of the pin section Y to form the heads 65. In accordance with the invention the heads 65 of the pin Y are in the nature of enlargements on the terminal end portions of the pin Y forming opposed inwardly facing shoulders 67 which engage the outer faces of the sides 17 of the tooth tip 12. The heads 65 project from the body of the pin section Y to establish the opposed shoulders 67 and these shoulders are spaced apart to receive or accommodate the tip 12 in the manner clearly illustrated in Fig. 5 of the drawings.

The spreader section Z normally yieldingly holds the metal sections X and Y of the pin apart, and in the preferred form of the invention it is a body or strip of rubber or the like, confined between the flat inner faces 55 and 56 of the metal pin sections X and Y, respectively. It is preferred to permanently bond the rubber spreader Z to the metal sections of the pin so that these parts form a permanent or unitary asembly.

In the preferred form of the invention the outer end corners 70 of both the pin sections are beveled or dressed away to facilitate entrance of the pin into the openings 40 and 41, and the outer ends of the pin section X are chamfered or dressed away at 71 to provide for entrance of a suitable wedge shaped tool T. In practice, the beveled corners 70 may be dressed away a minimum amount while the chamfers 71 are substantial, as shown in Fig. 4 of the drawings.

The retainer pin constructed as above described and as clearly illustrated in the drawings, particularly Figs. 5 and 6 of the drawings, is applied after the cap 13 has been engaged over the tip 12. The pin is introduced from one side of the structure, that is, through one of the openings 41 in the cap and the parts are so arranged and proportioned that for complete introduction of the pin it must be forced or driven into place in the course of which operation it passes through the opening 40 in the tip and finally projects into the other opening 41 in the opposite side of the cap. As the pin is thus driven or forced into place the spreader section Z thereof is compressed or deformed, putting the body of rubber under pressure so that it normally yieldingly urges the metal sections of the pin apart.

When the pin is in place, as above set forth, it bears against the forward wall of opening 40 and bears against the bearing faces 43 of the openings 41, as indicated by the arrows $a$ and $b$ in Fig. 5. As the pin thus exerts pressure on the tip and cap these parts are held securely or tightly engaged and the pin will remain in operating position due to the shoulders 62 engaging the sides of the cheeks 22 and the shoulders 67 engaging the sides 17 of the tip. The shoulders 62 and 67 are made of such extent or shape as to effectively maintain the pin in position under working conditions. However, it is a simple matter to apply the wedge shaped tool T to either end of the pin section X between the bearing face 42 and chamfer 71 and by the application of pressure to the pin to dislodge it when necessary. This can be done by striking or driving the tool with a hammer or the like, whereupon the pin 14 is easily removed from the openings 40 and 41 by pressure or suitable driving force applied to the end of the pin opposite to the end which has been disengaged through use of the tool T, as above set forth.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A retaining pin of the character described including, two separate elongate metal sections extending longitudinally of the pin and a resilient spreader section between the metal sections, the metal sections being oppositely faced and of like cross section, one of the sections having a central boss projecting laterally therefrom with outwardly faced shoulders, the other section having heads projecting laterally therefrom at the terminal ends thereof with inwardly faced shoulders, the sections being spaced apart and adapted to move bodily relative to each other.

2. A retaining pin of the character described including, two separate elongate metal sections extending longitudinally of the pin and a resilient spreader section between the metal sections, the metal sections being oppositely faced and of like cross section, one of the sections having an offset central portion forming a central boss projecting laterally therefrom with outwardly faced shoulders, the other section having offset end portions projecting laterally therefrom and forming heads at the terminal ends thereof with inwardly faced shoulders, the sections being spaced apart and adapted to move bodily relative to each other.

3. A retaining pin of the character described including, two separate elongate metal sections extending longitudinally of the pin and a resilient spreader section between the metal sections, the metal sections being oppositely faced and of like cross section with beveled ends, one of the sections having a central boss projecting laterally therefrom with outwardly faced shoulders, the other section having heads projecting laterally therefrom at the terminal ends thereof with inwardly faced shoulders, the sections being spaced apart and adapted to move independently and bodily relative to each other.

4. A retaining pin of the character described including, two separate elongate metal sections extending longitudinally of the pin and a resilient spreader section between the metal sections, the metal sections being oppositely faced and of like cross section, one of the sections having chamfered ends and a central boss projecting laterally therefrom with outwardly faced shoulders, the other section having heads projecting laterally therefrom at the terminal ends thereof with inwardly faced shoulders, the sections being spaced apart and adapted to move independently and bodily relative to each other.

5. A retaining pin of the character described for joining a pair of relatively movable parts, including, two separate elongate metal sections extending longitudinally of the pin and a resilient spreader section between the metal sections, the metal sections being oppositely faced and of like cross section with beveled ends, one of the sections having an offset central portion forming a central boss projecting laterally therefrom with outwardly faced shoulders engageable with one of said movable parts, the other section having offset end portions forming heads projecting laterally therefrom at the terminal ends thereof with inwardly faced shoulders engageable with the other of said movable parts, the sections being spaced apart and adapted to move independently and bodily relative to each other.

6. A retaining pin of the character described for joining a pair of relatively movable parts, including, two inpendently movable elongate metal sections extending longitudinally of the pin and a resilient spreader section between the metal sections, the metal sections being oppositely faced and of like cross section, one of the sections having a central boss projecting laterally therefrom with outwardly faced shoulders engageable with one of said movable parts, the other section having heads projecting laterally therefrom at the terminal ends thereof with inwardly faced shoulders engageable with the other of said movable parts, whereby the shoulders on the boss and the heads have independent locking engagement, the sections being spaced apart and adapted to move independently and bodily relative to each other.

7. A retaining pin of the character described for joining a pair of relatively movable parts, including, two independently movable elongate metal sections extending longitudinal of the pin and a resilient spreader section between the metal sections, the metal sections being oppositely faced and of like cross section with beveled ends, one of the sections having an offset central portion forming a central boss projecting laterally therefrom with outwardly faced shoulders, the other section having offset end portions forming heads projecting laterally therefrom at the terminal ends thereof with inwardly faced shoulders, whereby the shoulders on the boss engage one of said movable parts and whereby the shoulders on the heads independently engage the other of said movable parts, the sections being spaced apart and adapted to move independently and bodily relative to each other.

References Cited in the file of this patent

UNITED STATES PATENTS

| | | |
|---|---|---|
| 352,942 | Wood | Nov. 23, 1886 |
| 2,147,163 | Jimerson | Feb. 14, 1939 |
| 2,291,847 | Taylor | Aug. 4, 1942 |
| 2,669,153 | Launder | Feb. 16, 1954 |
| 2,702,490 | Launder | Feb. 22, 1955 |